United States Patent [19]

Kerpan et al.

[11] Patent Number: 5,361,801
[45] Date of Patent: Nov. 8, 1994

[54] BALL VALVE

[75] Inventors: Stephen J. Kerpan, La Habra; Gary F. McKee, Newport Beach, both of Calif.

[73] Assignee: Whittaker Controls, Inc., North Hollywood, Calif.

[21] Appl. No.: 59,829

[22] Filed: May 7, 1993

[51] Int. Cl.5 .............................................. E03B 3/18
[52] U.S. Cl. .................... 137/547; 137/315; 251/148; 210/238; 210/449
[58] Field of Search ............... 137/544, 547, 549, 315; 251/148; 210/238, 446, 447, 449

[56] References Cited

U.S. PATENT DOCUMENTS

| 1,179,387 | 4/1916 | Anschutz | 137/547 |
| 1,202,468 | 10/1916 | Allen | 137/547 |
| 2,786,504 | 3/1957 | Samler | 137/547 |
| 3,033,256 | 5/1962 | Schrenk | 137/547 |
| 3,348,694 | 10/1967 | Smith | 137/547 |
| 4,351,727 | 9/1982 | Brogger | 210/449 |
| 4,529,515 | 7/1985 | Selz | 210/238 |
| 5,188,335 | 2/1993 | Pettinaroli | 137/350 |

FOREIGN PATENT DOCUMENTS 87751 8/1936 Denmark ............................ 137/547

Primary Examiner—A. Michael Chambers
Attorney, Agent, or Firm—Christie, Parker & Hale

[57] ABSTRACT

A ball valve has a housing which rotatably carries a ball. The housing has inlet and outlet ports. The ball has two ports which may be rotated to align with the housing's ports. The ball carries a cartridge in a cartridge compartment located transverse to the ball ports. The cartridge has inlet and outlet ports between which a cartridge flow passage is defined. A strainer is located within the cartridge flow passage. The ball and cartridge may be rotated to an orientation in which the ball ports are substantially transverse to the housing ports, from which orientation the cartridge may be extracted from the ball and housing and the strainer may be removed from the cartridge.

31 Claims, 5 Drawing Sheets

BALL VALVE

BACKGROUND OF THE INVENTION

The invention pertains to rotatable element ball valves and more particularly to a construction of a ball valve having a removable strainer element and suitable for use in an aviation fuel delivery system.

Strainer ball valves are commonly used in aviation fuel delivery systems. In such systems a pump delivers fuel from a supply reservoir, such as an underground storage tank or tanker truck, through a delivery hose to a nozzle which is configured to mate with a fueling flange on an aircraft. Typically, a ball valve is located between the delivery hose and the nozzle and carries a strainer to prevent large particles of debris from entering the aircraft. Typical of such ball valves is the WL 3510 Strainer Ball Valve sold by WARNER LEWIS. That valve, has inlet and outlet ports located at opposite ends of a ball housing. The inlet port is configured for attachment to a delivery hose and the outlet port is configured for attachment to a fuel nozzle. A ball for controlling fuel flow is located intermediate the ports and is held for rotation about an axis perpendicular to the inlet and outlet ports. There is a flow passage formed through the ball and a strainer basket is mounted in the ball across the flow passage. The strainer basket has a mouth and a body. A keyed handle may be fitted into a slot in the ball through an opening in the housing aligned with the ball's axis of rotation.

The handle may be used to rotate the ball into one of three desired orientations. In a refueling orientation, the passage is located to allow communication between the inlet and outlet ports and the strainer mouth is positioned adjacent the inlet port such that debris will be strained from the fuel as it passes from the hose to the nozzle before entering the aircraft.

In a defueling orientation, wherein fuel is to be removed from an aircraft, the ball is rotated 180° from the fueling orientation so that the mouth of the strainer is adjacent the outlet port. In this orientation, fuel is drawn from the aircraft through the nozzle, the outlet port, the strainer, the inlet port and then into the hose on its way back to the supply reservoir. In this orientation the strainer serves to prevent debris in the aircraft's fuel tanks from entering the supply reservoir.

In a third orientation, the flow passage is perpendicular to the inlet and outlet ports so that no communication is permitted therebetween. In this so called service orientation, the mouth of the strainer is adjacent a service port in the housing which is located perpendicular to the inlet and outlet ports. A cover is provided for the service port, which when removed allows inspection of the strainer as well as removal of the strainer for cleaning. A slot is provided in the cover so that a mating keyed handle may be used to unscrew the cover from the housing.

In the WARNER LEWIS ball valve, to remove the strainer, a worker must insert the keyed handle into the slot in the ball, rotate the ball to the service orientation, remove the handle, fit the handle into the service port cover, unscrew the service port cover and then extract the strainer from the ball and housing using a special tool.

SUMMARY OF THE INVENTION

According to principles of the present invention, a ball valve has a removable cartridge in which a strainer is mounted. Specifically, the valve has a housing which rotatably carries a ball. The housing has inlet and outlet ports. The ball has two ports which may be rotated to align with the housing's ports. The ball carries the cartridge in a cartridge compartment located transverse to the ball ports. The cartridge has inlet and outlet ports between which a cartridge flow passage is defined. A strainer is mounted in the cartridge flow passage. The ball and cartridge may be rotated to an orientation in which the ball ports are substantially transverse to the housing ports, from which orientation the cartridge may be extracted from the ball and housing and the strainer may be removed from the cartridge.

BRIEF DESCRIPTION OF THE DRAWINGS

These and other features and advantages of the present invention will be appreciated as the same become understood by reference to the following detailed description when considered in connection with the accompanying drawings, wherein.

DETAILED DESCRIPTION OF THE ILLUSTRATED EMBODIMENT

Figure 1:
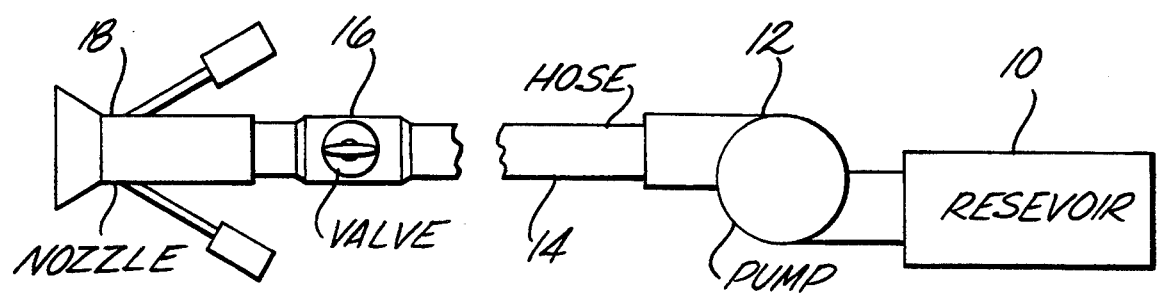
FIG. 1 is a schematic diagram of a fuel delivery system.
Figure 2:
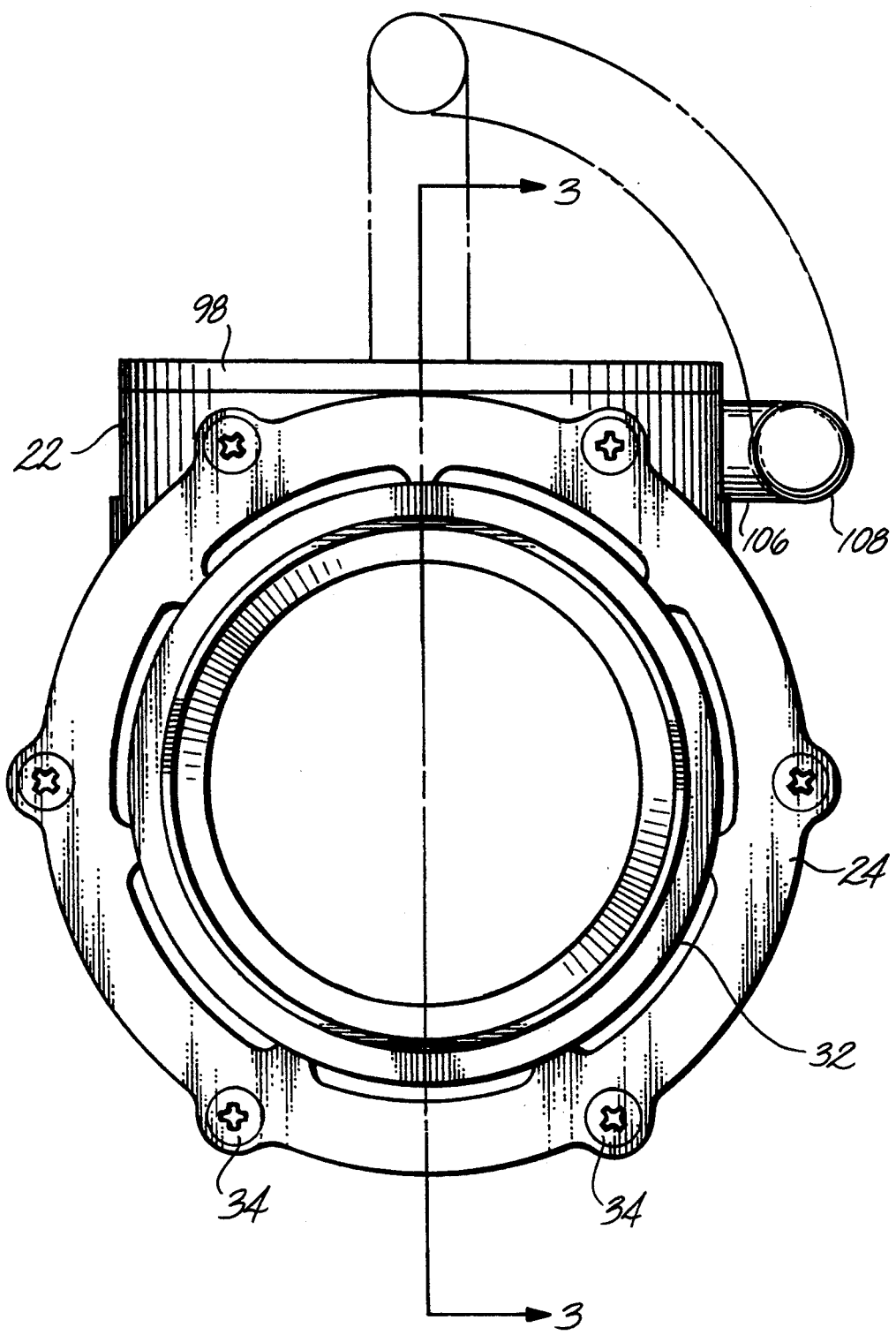
FIG. 2 is an end elevational view of a ball valve constructed according to principles of the invention.

As shown in FIG. 1, an aircraft fuel delivery system comprises a supply reservoir 10, a pump 12 in communication with the supply reservoir, a hose 14 connected between the pump and a ball valve 16, and a fuel nozzle 18 attached to the ball valve.

As further shown in FIGS. 2-5, the ball valve has a housing 20 comprising a body 22 and an end cap 24. The housing has an inlet port 26 and an outlet port 28 defined in the housing body and end cap, respectively. Inlet port 26 and outlet port 28 are aligned with a housing flow axis 200. The inlet port is bounded by a fitting 30 of the housing body for connecting to a hose and the outlet port is bounded by a flanged fitting 31 of the end cap for connecting to a nozzle. Such a nozzle is disclosed in a copending application entitled AIRCRAFT FUELING NOZZLE, Ser. No. 08/059,828, the disclosure of which is incorporated herein by reference. The end cap has a spacer 32 which is mounted in a bore 33. The end cap is secured to the housing body by six flat head screws 34 and is sealed to the housing body by an O-ring packing 35. The housing has a service port 36 oriented perpendicular to the inlet and outlet ports and bounded by a rim 38. The service port is aligned with a service port axis 202 that is perpendicular to the housing flow axis 200.

A ball 40 has a ball rotational axis 204 aligned with the service port axis 202. The ball fits within the housing and has a spherical bearing surface 42 and a flat bottom 44. The ball has a cylindrical cartridge compartment 46 oriented parallel to the ball axis with a compartment opening 48 in the bearing surface. An inlet port 50 and an outlet port 52 are defined in the bearing surface. The inlet port 50 and outlet port 52 are aligned with a ball flow axis 206 which is perpendicular to the ball rotational axis. The inlet and outlet ports 50 and 52 are open to the cartridge compartment 46 to allow communication between the ports. Annular seals 54a and 54b have beveled surfaces 55a and 55b which bear against the bearing surface of the ball. Seal 54a is mounted in an annular recess 56 in the housing body adjacent to the inlet port, and is compressed against the ball by an annular wave spring 57 which is also located in the annular recess 56. Seal 54b is mounted in an annular recess 58 in the end cap. The annular seals are further sealed in the annular recesses by seal packings 59a and 59b which are circumferentially positioned around the annular seals within the annular recesses.

A cartridge 60 with a cartridge rotational axis 208, has a substantially cylindrical body 62 having a base 63. The body 62 fits into the cartridge compartment of the ball. In an assembled valve, the cartridge and ball rotational axes 208 and 204, respectively, are coincident. The cartridge has cartridge inlet and outlet ports 64 and 66, respectively, formed in the cartridge body and which define a cartridge flow passage 68 therebetween. The inlet port 64 and outlet port 66 are aligned with a cartridge flow axis 210 which is perpendicular to the cartridge rotational axis 208. The cartridge flow passage 68 has a wall 69 having symmetry about the cartridge flow axis. A strainer 70, having a frustoconical wire mesh body 72 and an annular flange 74 which defines a strainer mouth 76, is mounted in the cartridge flow passage. The flange seats against an annular shoulder 80 of the cartridge flow passage where it is secured by an annular retainer clip 82, the ends of which are captured by a radial hole 84 in the flow passage wall 69.

A hexagonal protrusion 85 in the cartridge base interfits with a hexagonal hole 86 of the cartridge compartment 46 to act as keying means for securing the cartridge to the ball against relative rotation about the cartridge and ball rotational axes to permit the transmission of torque through the cartridge to rotate the ball. A tooth 87 in the cartridge base interfits with a slot 89, which extends from the hole 86, to ensure that the cartridge inlet and outlet ports may only be aligned with the ball inlet and outlet ports, respectively. The cartridge has splines 90 which project radially outwardly from the cartridge body. Housing splines 92 project radially inwardly from the housing adjacent the service port rim. The housing splines 92 are separated by gaps 91 and 91b on the service port rim. The cartridge splines and housing splines may be rotatably engaged so that the cartridge splines ride in an annular channel 93 adjacent the housing splines. With the cartridge splines and housing splines so engaged, the cartridge is locked in to the housing against extraction along the cartridge rotational axis. The cartridge and housing are sealed against each other by a cartridge seal 94 which is located in an annular recess 96 in the cartridge body adjacent the cartridge splines. A cover plate 98 for positioning the cartridge along the cartridge rotational axis and for retaining a handle 102 is attached to the cartridge body by four flat head screws 100.

The cartridge handle 102 comprises an axle 104, a shaft 106 and a grip 108. The handle axle has a D-shaped cross-section, having a flat surface 104a facing the handle grip, a rounded surface 104b facing away from the handle grip and substantially flat side-surfaces 104c and 104d connecting surfaces 104a and 104b. The handle axle is disposed perpendicular to the cartridge rotational axis and located in a pocket defined by an axle well 110 in the cartridge body, and the bottom surface 112 of the cover plate. The handle may be rotated about the axle with the shaft passing through a slot 114 of the cover plate and fitting into a recess 116 in the cartridge body and a recess 120 in the gap 91b in the service port rim. With the handle shaft fitted into the recess 120 the ball and cartridge are secured against rotation relative to the housing about the cartridge and ball rotational axes.

The handle axle is supported by a flat spring 128, the ends of which rest on shoulders 130a and 130b formed in the axle well on opposite sides of the axle. The spring supports and biases the handle axle into contact with the bottom surface 112 of the cover plate such that the cover plate may interact with the flat surface 104a or the substantially flat surface 104c of the handle axle. The cartridge is provided with an indicator such as arrow 136 which is painted on the cover plate.

Figure 3:
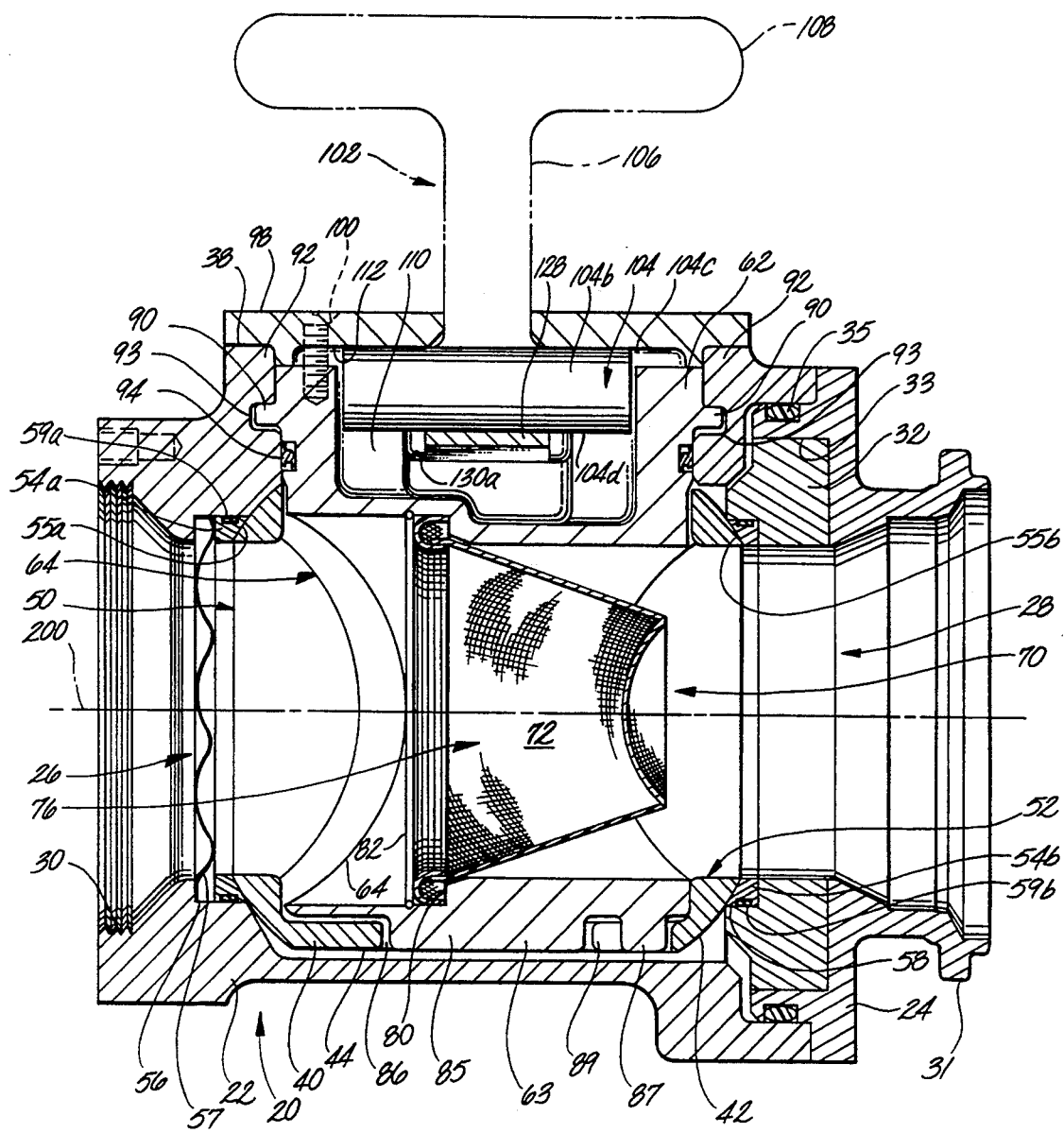
FIG. 3 is a side section of the ball valve of FIG. 2, taken along line 3—3 showing a cartridge body and a strainer in a refueling orientation.

In a refueling orientation, shown in FIG. 3, the valve is configured for the delivery of fuel from a supply reservoir to an aircraft. In this orientation, the ball and cartridge inlet and outlet ports are adjacent to and aligned with the housing inlet and outlet ports respectively. To refuel the aircraft, the nozzle of the fuel delivery system is connected to a fueling flange on an aircraft. Fuel is then pumped by the pump from the supply reservoir through the hose and through the ball valve to the nozzle and the aircraft. Within the valve, the cartridge is oriented so that the strainer mouth and cartridge inlet port are aligned with the housing inlet port so that the strainer points toward the inlet port. Accordingly, fuel flows through the mouth of the strainer, with any debris being trapped by the strainer as the fuel passes through the strainer body. In this orientation the ball and housing are sealed to each other by seals 54a and 54b, the beveled surfaces of which bear against the bearing surface of the ball surrounding the inlet and outlet ports respectively. The seal is maintained by the pressure exerted on seal 54a by the wave spring 57. As fuel passes between a ball port and the corresponding cartridge port, leakage between the cartridge compartment of the ball and the cartridge body is prevented by the cartridge seal 94. A similar seal may not be necessary adjacent the base of the cartridge body, as leakage between the compartment and the base will only rejoin the fuel flow and the small spacings involved will not compromise the straining function.

In the refueling orientation the cartridge and housing splines engage each other so as to lock the cartridge into the housing against movement along the cartridge rotational axis. The handle shaft is positioned in the recess 116 in the cartridge body and the recess 120 in the service port rim. With the handle in this position, the interaction of the shaft and the recess 120 secures the cartridge against rotation about the cartridge axis relative to the housing. The handle is biased against rotation out of the recesses by the spring 128 interacting with the substantially flat surface 104d of the handle axle so as to lock substantially flat surface 104c against the bottom 112 of the coverplate. The indicator arrow 136 points in the direction of fuel flow.

Figure 4:
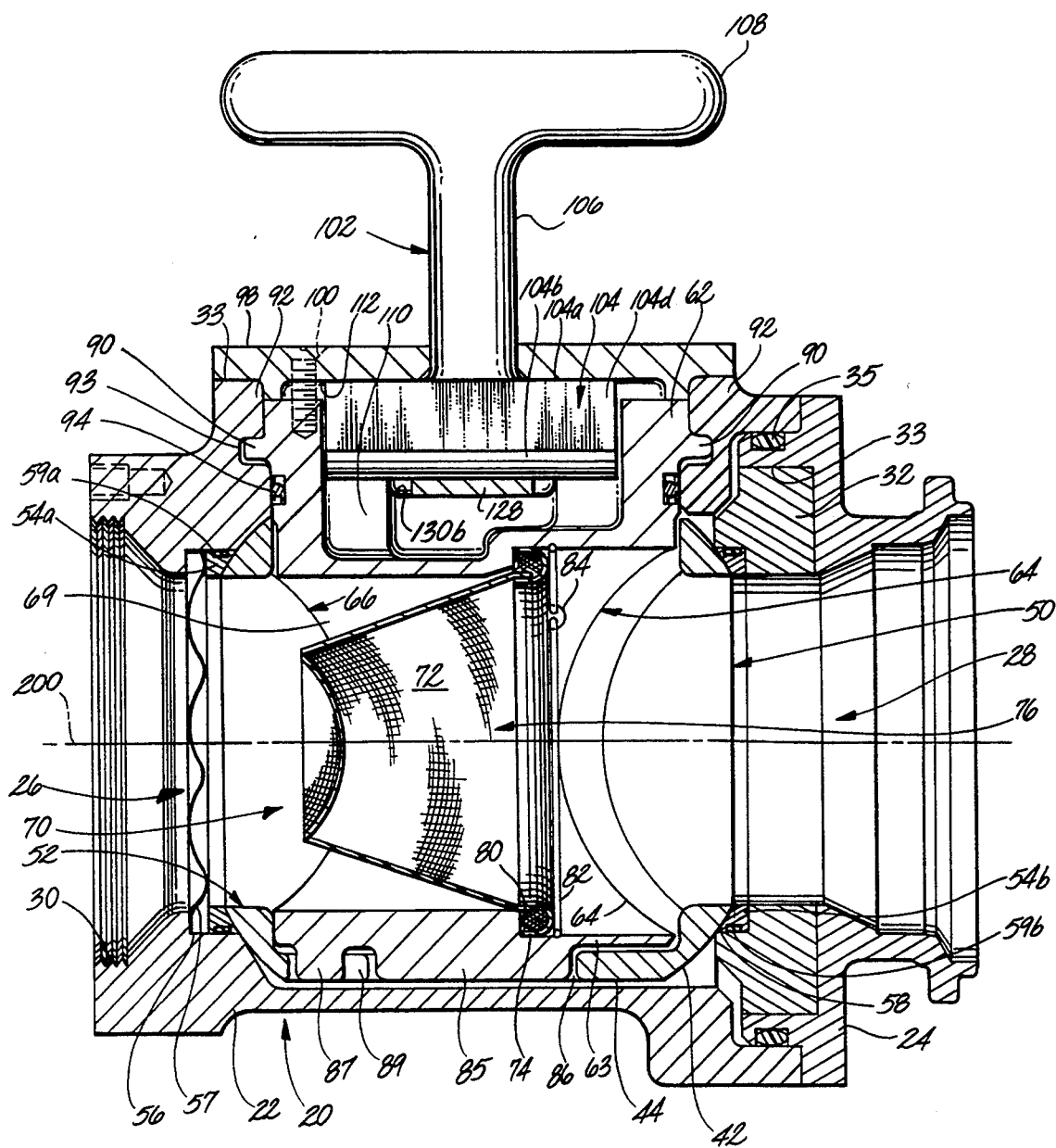
FIG. 4 is a side section of the ball valve of FIG. 3 showing a cartridge body and a strainer in a defueling orientation.

To rotate the cartridge, the handle shaft must first be rotated out of the recess 120 by the lifting the grip 108. As the handle grip is lifted, the handle axle rotates and the substantially flat surface 104c rolls out of contact with the flat spring 128 while the rounded surface 104b rolls into contact with it, thereby compressing the flat spring from an arched configuration (FIG. 3) to a flat configuration (FIG. 4). When the handle reaches a fully upright position, shown in FIGS. 4 and 5 and in phantom in FIGS. 2 and 3, the surface 104b is in contact with the spring, and the flat surface 104a interacts with and bears against the bottom surface 112 of the cover plate so as to bias the handle against rotation out of the upright position. With the handle shaft removed from the recess 120, the cartridge and ball may be rotated to assume a service orientation or a defueling orientation. If the cartridge and ball are rotated to a defueling orientation, the handle shaft may not be rotated into a recessed position as no recess is provided in the gap 91a. This helps to provide a visual indication of the orientation of the valve.

Figure 5:
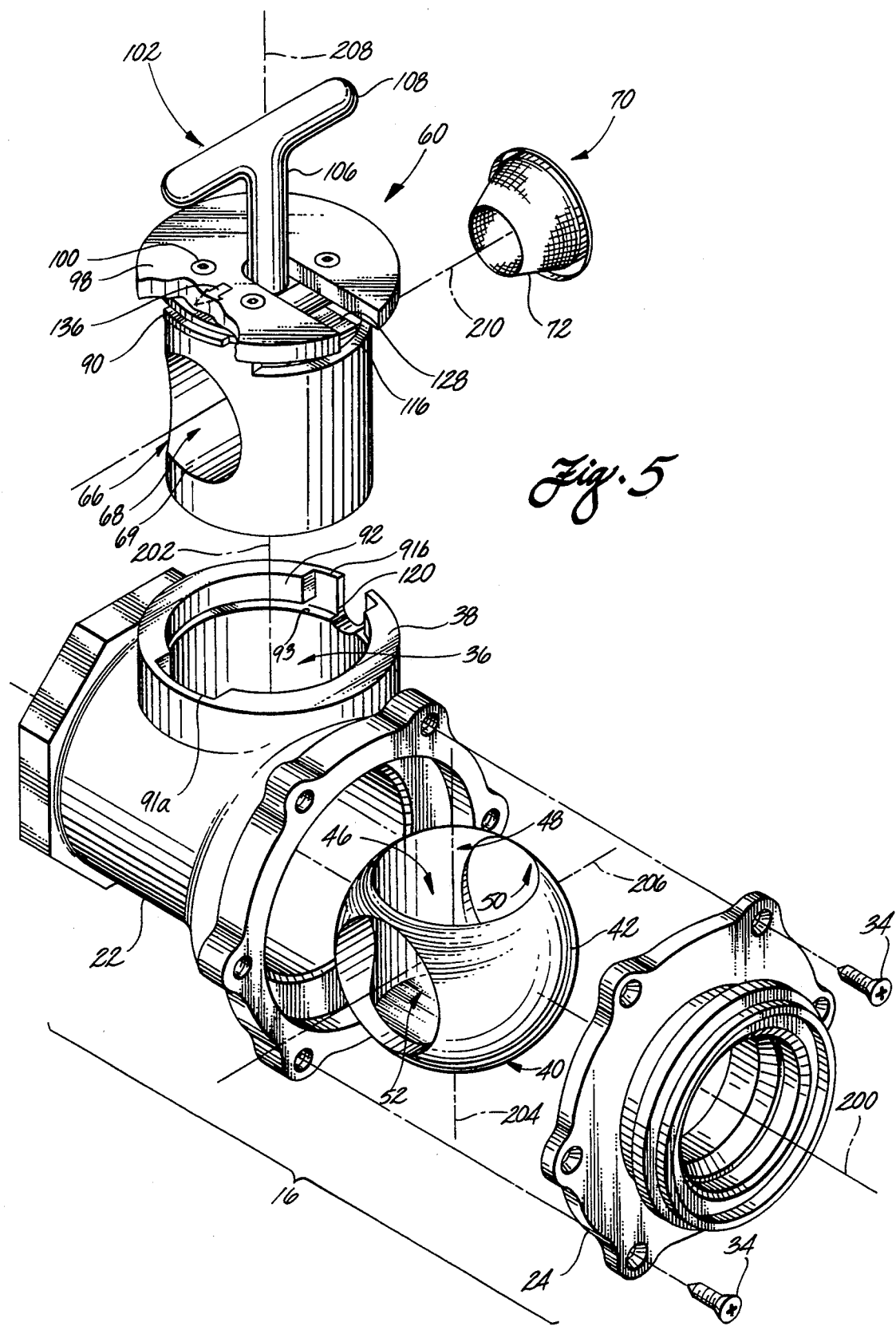
FIG. 5 is a partially exploded view of the ball valve of FIG. 2, showing a cartridge removed from a ball in a service orientation.

In a service orientation, characterized by the angular positions of the ball and cartridge in the exploded view of FIG. 5, the respective splines of the cartridge and housing are disengaged from each other so as to permit extraction of the cartridge from the housing and ball along the cartridge axis. With the spline configuration shown in the illustrated embodiments, the cartridge splines 90 are slightly narrower than the gaps 91a and 91b in the service port rim. As shown in FIG. 5, the gaps 91a and 91b separate the housing splines 92 so that in the service orientation, the cartridge splines are aligned with the gaps. In this disengaged orientation, the cartridge may be extracted with the cartridge splines passing through the gaps. In the service orientation the cartridge and ball inlet and outlet ports are oriented perpendicular to the housing inlet and outlet ports. The annular seals and thus the housing inlet and outlet ports are sealed by the bearing surface of the ball so that no fuel may pass between them. In this orientation the cartridge may be extracted along the cartridge axis and thereafter the strainer may be removed from the cartridge without leakage of fuel from the service port.

The cartridge and ball may be further rotated to assume a defueling orientation, shown in FIG. 4. In this orientation the cartridge and ball are rotated 180° about the cartridge and ball rotational axes from the refueling orientation so as to configure the valve for defueling an aircraft by draining fuel contained in the aircraft tanks into an appropriate storage tank. Accordingly, the ball and cartridge inlet and outlet ports are adjacent to and aligned with the housing outlet and inlet ports respectively. The strainer mouth is aligned with and the strainer points toward the housing outlet port. Accordingly, to defuel the aircraft, the nozzle of the fuel delivery system is connected to a fueling flange on an aircraft and fuel is then drawn by the pump from the aircraft through the nozzle and ball valve and through the hose back to the storage tank. The functioning and configuration of the valve are otherwise similar to those of the valve in the refueling orientation described above.

The ball is semi-spherical (ignoring the inlet and outlet ports and the compartment opening), having a flat bottom. The presence of such a bottom greatly reduces the necessary size and weight of the valve. Viewed along flow axis 200, the flat bottom prohibits significant roll and pitch rotations of the ball. Such rotation could cause the cartridge compartment to become misaligned with the service port when the cartridge is removed from the ball, thus making it difficult to reinsert the cartridge. If such misalignment was severe the bearing surface might fail to seal with the annular seals, causing leakage.

As shown, the cartridge and housing splines can be seen to establish two service orientations, with a second characterized by a rotation of the ball and cartridge 180° from that shown in FIG. 5. The cartridge splines are shaped similarly to each other and are relatively narrow compared with the housing splines. This allows the cartridge splines to be extracted through the gaps in the service port rim. A variety of different spline configurations are possible. It would be easy to arrange the splines to yield only a single service orientation, such as by providing two cartridge splines of different width corresponding to two gaps of different width.

In the preferred embodiment of the present invention, the housing body and end cap, the ball, the cartridge and the cartridge cover plate are made of aluminum. The handle is formed of an acetal resin in a bright color such as optic yellow. Additionally, the spacer 32 of the end cap 24 is formed of acetal resin. The screws, the wave spring, the flat spring, the retainer clip and the strainer are all formed of stainless steel. The mesh size of the strainer body may be selected to achieve a desired degree of filtration. The O-ring packing 35 is formed of nitrile rubber and the seal packings 59a and 59b are formed of a low swell nitrile rubber. The cartridge seal 94 and the annular seals 54a and 54b are formed of a polytetrafluoroethylene.

The advantages of a ball valve constructed according to principles of the present invention are easily seen. Workers do not have to carry special tools to rotate the ball between orientations or to remove a service port cover. Rotating the ball to a service orientation and extracting the cartridge may be done in a single operation. The strainer is very easy to remove from the cartridge as a worker has access to both cartridge ports and therefore can simply reach a finger through the cartridge outlet port after the cartridge has been removed from the housing and press the strainer out through the cartridge inlet port. The use of an indicator such as the arrow 136 as well as the presence of a large highly visible handle give an easy indication of the orientation valve and thus the corresponding direction of fuel flow.

The foregoing description of this invention is not an exhaustive catalog of all of the ways in which the invention may be practiced. Rather, the description is illustrative and exemplary. Those skilled in the art to the invention pertains we recognize and readily appreciate that other configurations are possible within the fair scope of the invention and by which the performance made possible by the invention can be achieved. By way of example, in a fuel delivery system, the ball valve of the present invention may have a variety of locations. For weight and size reduction, the valve might be integrally formed with the fuel nozzle. To eliminate the need for a worker to carry the weight of the valve altogether, the valve might be located upstream such as adjacent the outlet of a pump. Furthermore, the principles of the present invention may be applied to a valve wherein the "ball" does not have a spherical bearing surface, but rather has any other bearing surface with an axis of symmetry (so that the bearing surface has circular cross sections.) It is however noted that the spherical bearing surface yields a number of structural advantages including the presence of easy to manufacture annular seals. It can also be seen that a ball valve constructed according to principles of the present invention could be used in applications other than a fuel delivery system.

Accordingly, the following claims can be read, where proper, has having applications to both those things described above and shown in the drawings, and those other things which, while not expressly described, are within the scope of the invention according to the principles of equivalence.

What is claimed:

1. A valve comprising:
   a housing having housing inlet and outlet ports;
   a ball, rotatably carried in the housing for rotation about a ball axis, the ball having a ball inlet port, a ball outlet port and a cartridge compartment communicating with the ball inlet and outlet ports, the ball being rotatable between an open position in which the ball ports establish communication between the housing ports and a closed position in which the ball blocks communication between the housing ports;
   a removable cartridge carried in the cartridge compartment so as to rotate with said ball and having cartridge inlet and outlet ports and a flow passage therebetween; and
   a strainer mounted in the flow passage.

2. The valve of claim 1 wherein the housing comprises a body and an end cap, and wherein the inlet port is formed on the body and the outlet port is formed on the end cap.

3. The valve of claim 1 wherein the housing body has a service port oriented perpendicular to the housing inlet and outlet ports and wherein the cartridge may be extracted from the cartridge compartment along the ball axis and through the service port.

4. The valve of claim 1 wherein torque may be transmitted through the cartridge to rotate the ball.

5. The valve of claim 1 wherein the cartridge may be removed from the cartridge compartment without removing the ball from the housing.

6. A valve comprising:
   a housing having housing inlet and outlet ports;
   a ball, rotatably carried in the housing for rotation about a ball axis, the ball having a ball inlet port, a ball outlet port, and a cartridge compartment communicating with the ball inlet and outlet ports, the ball being rotatable between an open position in which the ball ports establish communication between the housing ports and a closed position in which the ball blocks communication between the housing ports;
   a removable cartridge carried in the cartridge compartment and having cartridge inlet and outlet ports and a flow passage therebetween; and
   a strainer mounted in the flow passage
   wherein the housing body has a service port oriented perpendicular to the housing inlet and outlet ports and wherein the cartridge may be extracted from the cartridge compartment along the ball axis and through the service port and wherein the ball may be rotated to assume:
   a refueling orientation in which the cartridge inlet and outlet ports are adjacent the housing inlet and outlet ports respectively;
   a defueling orientation in which the cartridge inlet and outlet ports are adjacent the housing outlet and inlet ports respectively; or
   a service orientation in which the cartridge inlet and outlet ports are perpendicular to the housing inlet and outlet ports and wherefrom the cartridge may be extracted.

7. The valve of claim 6 wherein the cartridge further comprises:
   a cover for positioning the cartridge in the cartridge compartment; and
   a cartridge spline which rotatably interfits with a housing spline such that when the ball is in the service orientation the cartridge may be extracted from the cartridge compartment, but in the refuel and defuel orientations, the cartridge cannot be extracted from the compartment.

8. The valve of claim 7 further comprising respective inlet and outlet annular seals which cooperate with a spherical bearing surface of the ball.

9. The valve of claim 8 further comprising a wave spring for compressing an annular seal against the ball.

10. The ball valve of claim 8 wherein the strainer comprises a body and an annular flange and the cartridge further comprises a shoulder in the flow passage for supporting the strainer flange.

11. The valve of claim 10 further comprising a retainer clip for securing the strainer flange within the flow passage.

12. The ball valve of claim 10 wherein the strainer has a frustoconical body formed of a metal wire mesh.

13. The valve of claim 8 wherein the cartridge compartment is substantially cylindrical and the cartridge has a substantially cylindrical cartridge body which bears the cartridge inlet and outlet ports and wherein the cartridge and ball bear interfitting keying means for irrotatably coupling the cartridge to the ball when the cartridge is carried by the ball.

14. The valve of claim 7 wherein the splines are configured to permit extraction of the cartridge only when the annular packings are sealed by the bearing surface.

15. The valve of claim 14 further comprising a cartridge handle pivotally coupled to the cartridge for rotation about an axis perpendicular to the ball axis.

16. The valve of claim 15 wherein the handle has an axle which bears a plurality of surfaces and the cartridge further comprises means for interacting with the surfaces.

17. The valve of claim 16 wherein the handle further comprises a handle shaft and the cartridge further comprises a recess for receiving the handle shaft when the ball is in the fueling orientation.

18. The valve of claim 17 wherein the housing further comprises a service port rim which includes a fueling recess for receiving the handle shaft when the ball is in the fueling orientation.

19. The valve of claim 15, wherein the handle is substantially upright when the ball is in the refueling and service orientations.

20. A fuel delivery system comprising:
   a hose for carrying fuel from a storage tank;
   a fuel nozzle for ejecting fuel carried by the hose;
   a valve having an inlet connected to the hose and an outlet connected to the nozzle and having a movable flow control member, the flow control member operating to permit fuel flow between the inlet and the outlet in a first position and to prevent fuel flow between the inlet and the outlet in a second position;
   a cartridge removably fitting into the flow control member without affecting its operation;
   a strainer; and
   means for holding the strainer in the cartridge in the path of fuel flowing between the inlet and the outlet of the valve.

21. The system of claim 20, in which the flow control member is rotatable.

22. The system of claim 21, in which flow control member has a circular cross section in its plane of rotation.

23. The system of claim 22, in which a flow passage is formed through the flow control member and the cartridge, the flow passage being aligned with the inlet and the outlet when the flow control member is in the first position.

24. The system of claim 23, in which the flow control member is semi-spherical and the cartridge is cylindrical.

25. The system of claim 24, in which the valve has a housing with a semi-cylindrical cavity in which the flow control member rotatably fits.

26. The system of claim 25, in which the strainer has a peripheral flange and the holding means comprises a shoulder in the flow passage against which the flange seats.

27. The system of claim 25, in which the flow control member is rotatable at least 180° so the strainer can be pointed toward the outlet or toward the inlet.

28. The fuel delivery system of claim 20 wherein said cartridge is carried by said flow control member so as to rotate with said flow control member.

29. The fuel delivery system of claim 20 wherein said strainer is located within said control member for trapping debris in the fuel flow.

30. A valve comprising:
a housing having housing inlet and outlet ports;
a ball, rotatably carried in the housing for rotation about a ball axis, the ball having a ball inlet port, a ball outlet port and a cartridge compartment communicating with the ball inlet and outlet ports, the ball being rotatable between an open position in which the ball ports establish communication between the housing ports and a closed position in which the ball blocks communication between the housing ports;
a removable cartridge carried in the cartridge compartment and having cartridge inlet and outlet ports and a straight flow passage therebetween; and
a strainer mounted in the flow passage.

31. A valve comprising:
a housing having housing inlet and outlet ports;
a ball, rotatably carried in the housing for rotation about a ball axis, the ball having a ball inlet port, a ball outlet port and a cartridge compartment communicating with the ball inlet and outlet ports, the ball being rotatable between an open position in which the ball ports establish communication between the housing ports and a closed position in which the ball blocks communication between the housing ports;
a removable cartridge carried in the cartridge compartment and having cartridge inlet and outlet ports and a flow passage therebetween; and
a strainer mounted in the flow passage and located within the ball for trapping debris in a fuel flowing through the valve.

* * * * *